United States Patent [19]
van der Spek et al.

[11] Patent Number: 5,683,636
[45] Date of Patent: Nov. 4, 1997

[54] METHOD OF FAN BLADE MANUFACTURE

[75] Inventors: Hendrik Fedde van der Spek; Henricus Johannes Bernardus Olthof, both of Hengelo, Netherlands

[73] Assignee: Ventilatoren Sirocco Howden B.V., Netherlands

[21] Appl. No.: 680,254

[22] Filed: Jul. 11, 1996

[30] Foreign Application Priority Data

Jul. 19, 1995 [GB] United Kingdom .................. 9514763

[51] Int. Cl.$^6$ ..................... B29C 44/06; B29C 44/12
[52] U.S. Cl. .............. 264/45.7; 264/46.6; 264/46.7; 264/271.1; 264/311
[58] Field of Search ................... 264/310, 311, 264/45.7, 46.6, 46.7, 271.1

[56] References Cited

U.S. PATENT DOCUMENTS

| | | | |
|---|---|---|---|
| 3,008,859 | 11/1961 | Smack | 264/46.7 |
| 3,329,751 | 7/1967 | Slicker et al. | 264/311 |
| 3,364,292 | 1/1968 | Lemelson | 264/311 |
| 3,391,823 | 7/1968 | Tijms | 264/311 |
| 3,541,192 | 11/1970 | Shapero et al. | 264/310 |
| 3,647,317 | 3/1972 | Furlong et al. | 416/226 |
| 3,875,275 | 4/1975 | Lemelson | 264/45.7 |
| 4,352,766 | 10/1982 | Bradley et al. | 264/45.5 |
| 4,457,729 | 7/1984 | Peerlkamp | 264/45.7 |

FOREIGN PATENT DOCUMENTS

| | | | |
|---|---|---|---|
| 2038112 | 2/1972 | Germany | 264/311 |
| 2403982 | 8/1975 | Germany | 264/311 |
| 225943 | 8/1985 | Germany | 264/46.7 |
| 49-38020 | 10/1974 | Japan | 264/310 |
| 50-32105 | 10/1975 | Japan | 264/311 |
| 51-93968 | 8/1976 | Japan | 264/310 |

*Primary Examiner*—Allan R. Kuhns
*Attorney, Agent, or Firm*—Harness, Dickey & Pierce, P.L.C.

[57] ABSTRACT

A blade for a fan is formed by rotomolding around a pre-positioned support member, part of which extends out of the mold, the support member being shaped, or being provided with one or more projections, which are partly embedded in the plastic material forming a skin of the fan blade. The fan blade is made hollow by this method, but is preferably filled either during molding or subsequently with a hard foam material. A hub is also provided for mounting any fan blades, but in particular those made by the method, in which a hub includes a body portion having a first radial face associated therewith, a plate having a second radial face parallel to the first radial face and spaced therefrom, and a plurality of circumferentially equally spaced depressions facing one another on the first and second radial faces to accommodate the fan blade support members, means being provided to secure the plate to the body portion effective to clamp the fan blade and support members firmly.

9 Claims, 2 Drawing Sheets

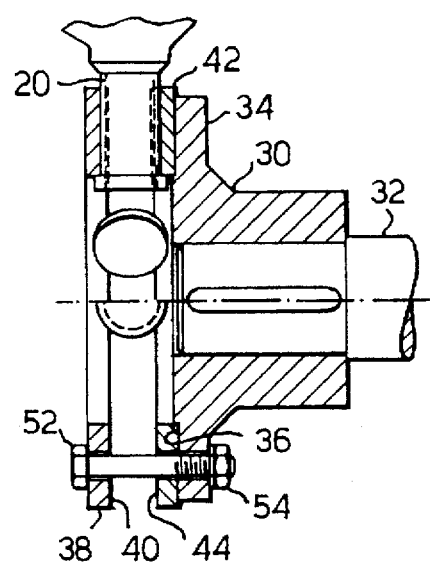
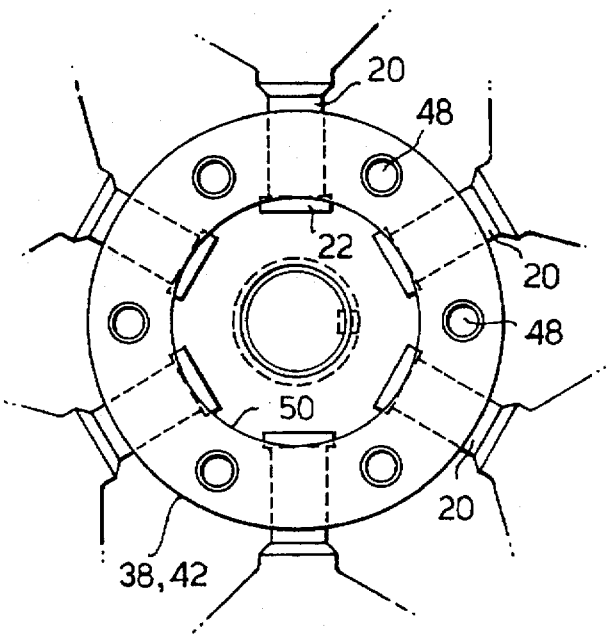
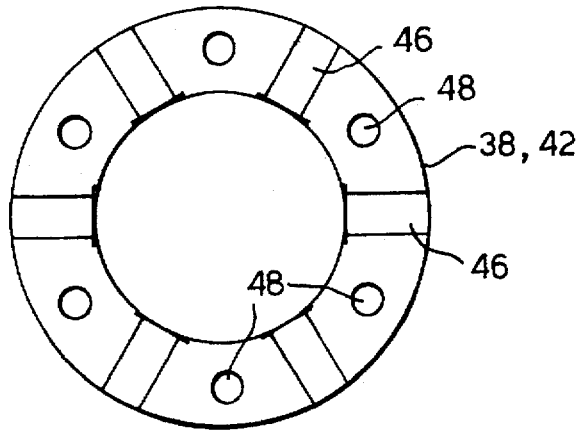

METHOD OF FAN BLADE MANUFACTURE

The present invention relates to a method of forming a fan blade, in particular but not exclusively a fan blade for use in a cooling tower fan.

Traditionally fan blades have been made in a large number of different ways. Early fan blades were made of wood. Subsequently they were constructed of metal such as aluminium by various methods. In more recent times, it has been proposed to form the fan blades, in one way or another, using glass reinforced plastic. For example, WO-92-02410 discloses a method in which a foam core is provided with a support member and the foam core is shaped accurately to be that of the desired fan blade. In a conventional manner a glass reinforced skin is formed on the outside of the foam core and this can provide reasonably satisfactory results and a high degree of polish can be achieved to reduce drag etc.

However, a problem with this method is that the production of fan blades thereby is rather expensive.

It is now proposed, according to the present invention, to provide a fan blade, said method comprising the steps of:

providing a mould having an internal wall surface shaped to correspond to the desired external shape of the fan blade;

positioning an elongate support member in said mould, to extend along the direction of length of the fan blade, the support member being spaced from the internal wall surface;

introducing a thermoplastic plastics material into the mould;

heating the mould; and rotating the mould so that the plastics material flows to the internal wall surface, the quantity of the plastic being chosen effective to ensure that the support member is partially embedded in the plastics material and so that the resulting blade is hollow.

It has been found that with the method of the invention, a fan blade can be produced at a cost which is perhaps 30% less than that which can be achieved using the method disclosed in WO-92-02410.

Rotation of the mould may be about one or two axes.

The support member of the present invention may take a number of different forms. For example, it may in the form of a hollow tube. The hollow tube may be a circular cross-section, but it may be of a number of other different shapes, and it preferably is provided with some form of projection which is at least partly embedded in the plastics material. Now, this projection may simply be caused by a non-circular cross-section of the support member or, it may be formed by providing one form or another of projecting element which extends outwardly from the outer surface of the support member. Thus it could be in the form of a barb or it could be in the form of the corner of a polygonal support member. Indeed the support member could take any shape which may be round, polygonal or some curvilinear shape such as elliptical. Thus, the shape of the support member is of some importance to the present invention insofar as it provides a key to enable the rotomoulded plastic material to adhere firmly thereto. While the support member could extend the full length of the blade to the tip, it can be shorter.

The actual form of the support member, as indicated above, may have one of many different cross-sections. It is also contemplated that where the fan blade is itself of changing cross-section from the root to the tip or some proportion of that length, that the support member itself could be of a reducing cross-section. This may be by forming a tapered bar or tube. However this is relatively expensive to manufacture, so it is contemplated that the support member may be in the form of a number of tubes secured to one another, the tubes being of diminishing cross-section. Looked at in another way, the support member may be rather like an extended telescope with the various portions of the telescope secured to one another, e.g. by welding. Thus, standard cylindrical constant cross-section tubes may be used, one fitted within the other.

It is also contemplated that the support member could include one or more arms or prongs rather in the manner of a fork, thereby to give a good bond to the rotomoulded plastic material.

While it is contemplated that the blade according to the invention could be hollow, preferably it is filled with a foam plastic material. This may be achieved by using a polyurethane foam which may be filled into the mould after the moulding of the blade skin.

An alternative approach is for the foam activated material to be used and this may be introduced in a two stage process. For example, a suitable material such as polyethylene, which may be high or low density polyethylene, can be enclosed in a thermoplastic sack which is placed within the mould during the initial moulding process, the thermoplastic sack initially retaining the foam activatable powder therein. However, when the temperature rises sufficiently, the plastic sack will melt thereby releasing the foamable material which then expands in a conventional way. The resulting foam is preferably a relatively hard foam to give the fan blade adequate rigidity.

Of course the foam activated plastic may simply be applied after the initial rotomoulding has been completed. This may be done, for example, by injection or other means.

It will be appreciated that one of the benefits of using rotomoulding technique is that the plastic skin which forms the outer surface of the fan blade will shrink when the mould is cooled. Not only does this effectively release the external surface of the fan blade from the mould, but more importantly the plastic material shrinks onto the support member, thereby giving a far better bond.

According to another aspect of the present invention, there is provided a hub for a radial bladed axial flow fan, said hub comprising a body portion connectable to or forming part of a shaft rotatable about its axis, a first radial face associated with said body portion, a plate having a second radial face parallel to said first radial face and spaced therefrom, a plurality of circumferentially equally spaced depressions facing one another on said first and second radial faces to accommodate fan blade support members and means to secure said plate to said body portion effective to clamp said fan blade support members firmly.

Such a hub may be used for any form of fan blade, but is preferably used with the fan blade formed by the method of the invention. The structure of hub according to the invention is again relatively inexpensive to manufacture and enables the fan blade easily to be assembled onto the hub without the need for any special tools.

While the first radial face may form part of the body member, preferably it is formed on a further plate which is retained on the body by the securing means. The further plate and the first plate are preferably identical and so there will be no difficulty in assembly. Similarly, from a manufacturing point of view using identical plates is relatively inexpensive and enables these plates to formed, e.g. by casting, or may be formed by machining, e.g. in computer controlled machining station. In either event the actual production of the disks can be extremely inexpensive, as can the be subsequent assembly of the fan blades particularly if the securing means are simply in the form of bolts passing through apertures formed in these plates.

The invention also provides a fan blade formed from the method of the invention and a fan including a plurality of fan blades which may be of the type formed by the method or not.

BRIEF DESCRIPTION OF THE DRAWINGS

In order that the present invention may more readily be understood, the following description is given, merely by way of example, reference being made to the accompanying drawings in which:

FIG. 5 is a section through a fan hub according to the invention illustrating how fan blades are mounted therein;

FIG. 6 is a schematic end elevation of the fan hub of FIG. 5; and

FIG. 7 is an end view of one of the plates used in the fan hub of FIGS. 5 and 6.

DETAILED DESCRIPTION OF THE INVENTION

Figure 1:
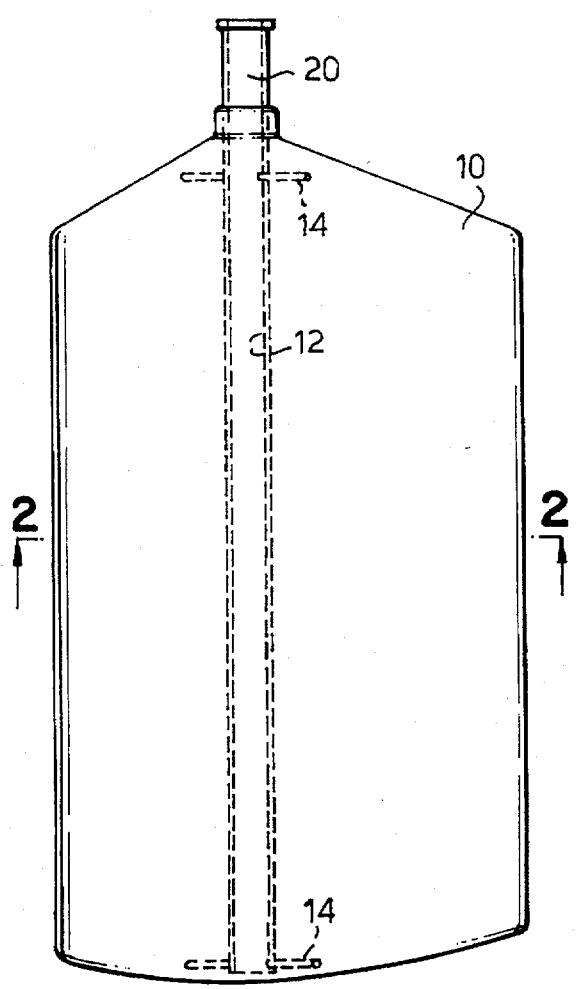
FIG. 1 front elevation of one embodiment of blade manufactured by the method of the present invention.
Figure 2:
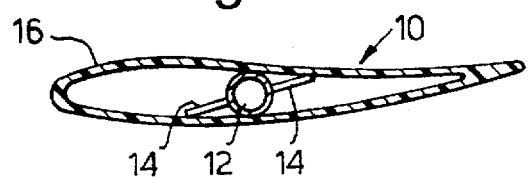
FIG. 2 is section taken along the line 2—2 of FIG. 1.

The blade 10 shown in FIG. 1 is of an aerofoil section as indicated in FIG. 2. The blade is formed by rotomoulding by first inserting, into a suitably shaped mould, a support member 12 in the form of a metal tube, for example a steel tube, this being provided with a number of projections in the form of barbs 14. The dimensions of the tube 12 and the barbs 14 are chosen so that, during the rotomoulding process, the plastics material, which may for example be high density polyethylene or polypropylene, will contact both the barbs 14 and the tube 12 itself, so that the barbs and the tube are slightly embedded in the plastic material of the skin 16 formed by the rotomoulding process. Rotomoulding can be effected by rotation of the mould, the internal surface of which is, of course, shaped to conform to the desired external surface of the fan blade 10, this rotation taking place about one or two axes of rotation.

It is also contemplated that the thermoplastic material could be introduced into the mould prior to positioning the elongate support member, the mould heated and rotated thereby to provide a blade skin. The support member could then be positioned and secured to the skin. As can be seen from FIG. 2, the resulting product, whether or not the support is introduced first, is hollow. In a preferred arrangement, the interior is filled with a foam, for example a rigid polyurethane foam. This may be effected by filling the interior of the blade, while it is still in the mould, after moulding of the blade skin, with the polyurethane foam forming material which will be activated by the heat of the mould.

An alternative approach is to initially include in the mould a sack of thermoplastic material filled with a foam forming activatable powder, such as high density polyurethane foam forming powder. When the temperature in the mould rises to a sufficient temperature, the thermoplastic bag will melt, thereby releasing the foam forming material which is then activated to fill the interior of a hollow blade. Foam filling material is illustrated schematically at 18 in FIG. 3.

Figure 3:
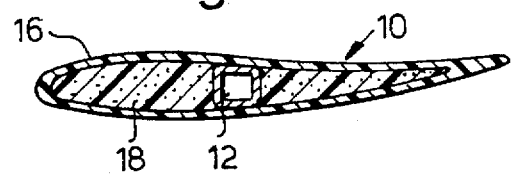
FIG. 3 is a view similar to FIG. 2 of a second embodiment.

In FIG. 3 there is illustrated a somewhat modified version in which instead of having a circular cross-section tube, a polygonal cross-section tube, for example an approximately square cross-section tube, is used. With such a construction because of the square shape, or indeed of any other non-circular shape, there will not be any need, although they may be used, for any radial projections similar to the projections 14 shown in FIG. 2.

Figure 4:
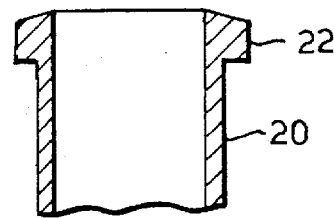
FIG. 4 is an enlarged fragmentary section through the end portion of the support member of the blade shown in FIG. 1.

Referring to FIG. 1, it can be seen that an external portion 20 of the tube 12 extends outside the mould and is free from any plastics material formed thereon. This portion 20 is illustrated in a larger cross-section in FIG. 4 and it can be seen that it is provided with an annular rim 22 for a reason to be explained later. The rim 22 and the barbs 14 may, for example, be formed by pressing.

Various methods are contemplated for mounting the blade to form a fan, but according to another aspect of the invention, there is illustrated in FIGS. 5, 6 and 7, a particular form of fan hub. A hub body portion 30 is keyed to a drive shaft 32 and includes an annular flange 34. The flange 34 has a first radial face 36.

Spaced from the radial face 36 is an annular plate 38, having a second radial face 40.

In the embodiment illustrated, abutting the first radial face 36 is a further plate 42, having an additional first radial face 44.

As illustrated in FIG. 7, the two annular plates 38,42, have six circumferentially equally spaced depressions of part circular shape. Positioned between the depressions 46 are apertures 48.

In order to mount a fan blade, which may be of the type formed by the method of the invention, the extended portion 20 of the support member 12 is engaged in one of the depressions 46, the annular rib 22 engaging the inner surface 50 of the annuli of the disks 38,42. Bolts 52, provided with nuts 54, are passed through the apertures 48 and tightened up, whereby the plates 38,42 firmly clamp the projecting portions 20 of the support members 12. Of course immediately prior to full tightening, the pitches of the blades are adjusted to be equal.

Instead of having the further plate 42, the depressions 46 could be formed in the flange 34.

The various components can be made relatively inexpensively. The hub body portion 30 can be cast or machined as can the disks 38,42. The clamping up is relatively simple, requiring no special tools.

We claim:

1. A method of forming a fan blade, said method comprising the steps of:

providing an elongate support member;

providing a plurality of projections on said elongate support member, which extend outwardly directly from said elongate support member;

providing a mold having an internal wall surface shaped to correspond to the desired external shape of the fan blade;

positioning said elongate support member in said mold, to extend along the direction of length of the fan blade, the support member being spaced from the internal wall surface;

introducing a thermoplastic plastics material into the mold;

heating the mold; and rotating the mold so that the plastics material flows to the internal wall surface, the quantity of the plastic being chosen effective to ensure that the support member and tips of said projections are partially embedded in the plastics material and that the resulting blade is hollow.

2. A method as claimed in claim 1, wherein the support member is in the form of a hollow tube.

3. A method as claimed in claim 1, wherein said one or more projections are formed by welding or pressing.

4. A method as claimed in claim 1, wherein the plastics material is a powder.

5. A method as claimed in claim 4, wherein the powder is high density polyethylene or polypropylene.

6. A method as claimed in claim 1, wherein, prior to positioning the elongate support member, the method comprises the further step of introducing plastic material into the mold whereby a blade skin is formed therefrom on the internal wall surface of the mold.

7. A method as claimed in claim 1, and further comprising the subsequent step of filling the hollow blade with plastics foam material.

8. A method as claimed claim 7, wherein the foam material is a polyurethane foam filled into the mold after the molding of the blade skin.

9. A method as claimed in claim 7, and further comprising the step of feeding or releasing a foam forming activatable material, such as high density polyethylene, into the mold at a later stage, but while the mold is still heated, whereby the foam forming material is activated.

* * * * *